United States Patent [19]

Fellenbaum

[11] Patent Number: 4,733,907
[45] Date of Patent: Mar. 29, 1988

[54] BICYCLE CUSHION SEAT COVER WITH AERODYNAMIC SHAPED BAG

[76] Inventor: Ernest S. Fellenbaum, 1234 11th St., Santa Monica, Calif. 90401

[21] Appl. No.: 89,918

[22] Filed: Aug. 25, 1987

Related U.S. Application Data

[63] Continuation of Ser. No. 874,044, Jun. 13, 1986, abandoned.

[51] Int. Cl.$^4$ .............................................. B62J 1/18
[52] U.S. Cl. .................................. 297/188; 297/214; 297/219; 297/195
[58] Field of Search ................ 297/214, 195, 219, 188

[56] References Cited

U.S. PATENT DOCUMENTS

| | | | |
|---|---|---|---|
| 1,271,375 | 7/1918 | Saunders | 297/214 |
| 1,322,959 | 11/1919 | Sawasaki | 297/214 |
| 1,991,751 | 2/1935 | Kennedy | 297/214 |
| 3,580,633 | 5/1971 | DuPriest | 297/188 |
| 3,844,610 | 10/1974 | Adams | 297/214 |
| 4,093,263 | 6/1978 | Rihm . | |
| 4,319,781 | 3/1982 | Tsuge | 297/214 |

FOREIGN PATENT DOCUMENTS

| | | | |
|---|---|---|---|
| 1142015 | 3/1957 | France | 297/188 |
| 209249 | 1/1924 | United Kingdom | 297/219 |
| 306284 | 2/1929 | United Kingdom | 297/214 |
| 434147 | 8/1935 | United Kingdom | 297/188 |

Primary Examiner—Francis K. Zugel
Attorney, Agent, or Firm—Gene W. Arant; Matthew F. Jodziewicz; L. Kenneth Rosenthal

[57] ABSTRACT

A bicycle cushion seat cover with aerodynamic shaped bag is described which provides comfort and support to the bicyclist without chaffing and bruising. The bicycle cushion seat cover with aerodynamic shaped bag weighs less than 9 ounces and is composed of a foam with a density of 1.8 to 2.8 lbs. per cubic foot and an impression force deflection of between 75 and 95, a vinyl cover having a density of 2 ounces per square foot, 2 underside flaps and an underside lining with a density of 2 ounces per square yard which provides firm attachment means, and an aerodynamic shaped bag with maximum dimensions less than those of the maximum back dimensions of the bicycle cushion seat cover such that the bag creates minimal aerodynamic drag.

3 Claims, 4 Drawing Figures

BICYCLE CUSHION SEAT COVER WITH AERODYNAMIC SHAPED BAG

This is a continuation of application Ser. No. 874,044 filed June 13, 1986 and now abandoned.

FIELD OF THE INVENTION

This invention relates to a comfortable bicycle cushion seat cover that is easily applied to a wide variety of bicycle seats which has an aerodynamically shaped bag attached to it for easy carrying and storage of various sundry items. The bicycle cushioned seat cover with aerodynamic shaped bag is light weight, comfortable, prevents shocks and bruises and is aerodynamically designed such as to minimize drag.

PRIOR ART

A variety of bicycle seat covers, cushions, and pads exist in the prior art. Although many of these devices are more comfortable than the bicycle seat supplied with the bicycle, they are still uncomfortable when used for a prolonged length of time. The materials of these bicycle covers and pads may consist of furs, elastomers, rubbers, foam, air and even water bags. Although they offer some cushion from the bumps encountered during the riding of the bicycle they often exhibit a jello like feel or are too firm, and may not be thick enough to absorb the large shocks that accompany a bicycle ride. They may also add several pounds weight to the bicycle. These prior art devices also are typically not optimally designed from an ergonomic standpoint. After prolonged bicycle riding these covers and pads may cause chaffing and rubbing to the thighs of the bicyclist. Also, as bicycle seats and the anatonomical bottom of the bicyclist vary greatly, often these bicycle seat covers and pads are poor fits to either one or both. A variety of attachments have been employed to fasten the bicycle covers and pads to the bicycle seat. These attachments include straps and pockets. The straps on the underneath of the bicycle cover or pad often require additional work and may become loose over time. The pockets which come with or in addition to the strap often do not accommodate a wide variety of seats, are often hard to attach, and sometimes cannot grip the attached bicycle seat adequately and slip due to the constant movement of the bicyclist's anatomy.

Finally, various holders, bags, and pouches are available for attachment on the bicycle that allow the bicyclist to carry various sundry items which include wallets, keys and various other memorabilia. These bags must be attached separately to the bicycle and require sometime to put on. They are often large and, from an aerodynamic standpoint, induce drag during the bicycling. They are heavy, often aesthetically unpleasing and if improperly attached can fall off or be easily removed.

SUMMARY OF THE INVENTION

Herein is described a bicycle cushion seat cover with aerodynamic shaped bag that is comfortable and that will absorb most shocks and pressures and prevent bruising and chaffing to the bicyclist. The invention contains a resilient foam that will accommodate a large variety of body weights and shapes and will provide an increased resilience as additional pressure is applied to the seat cover. The bicycle cushion seat cover with aerodynamic shaped bag is designed to fit easily and quickly over a wide variety of bicycle seats with no slippage. The attached bag is aerodynamic and aesthetic and takes advantage of the dead space near the back of the bicycle cushion seat cover. The bag is also designed to hold its own structure without a large amount of additional weight. The bicycle cushion seat cover with aerodynamic shaped bag is lightweight and will add no more than nine (9) ounces to the weight of the bicycle system. Finally, the invention is inexpensive and will accomdate a large variety of bicycle seats and human shapes.

DETAILED DESCRIPTION OF THE INVENTION

Figure 1:
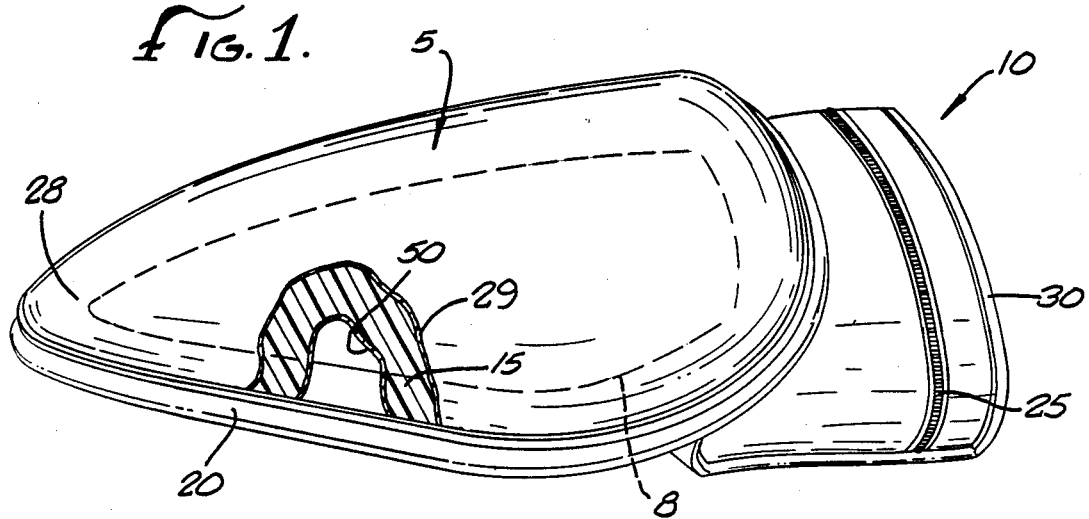
FIG. 1 is a perspective view showing the bicycle cushion seat cover with the aerodynamic shaped bag.

Referring to FIG. 1 bicycle cushion seat cover 5 is provided its cushion by foam 15. It is important that foam 15 be dense enough and resilient enough to protect the bicyclist against bruises and shock but light enough as not to add undue weight to the bicycle system. It is found that foam 15 should ideally be composed of a material of density of 1.8 lbs. per cubic foot to 2.8 lbs. per cubic foot. Futhermore, the impression force deflection of foam 15 should ideally be between 75 IFD and 95 IFD. The IFD, impression load deflection measurement, of foam 15 relates to its resilience and compression. A high IFD such as 75 means that as additional weight is applied to foam 15, said foam 15 offers more resistance and resilience. Therefore, a foam with a low IFD such as 25 would be easily compressed by a heavier bicyclist who would quickly come in contact with the seat provided on the bicycle and experience discomfort and shock shortly after bicycling. It has been determined that the range of 75 IFD to 95 IFD provides the appropriate resilience and support for a wide range of bicyclists' weights and anatomies.

Foam 15 should also be of an open cell nature. An open cell foam is one that allows the air to pass from air pocket to air pocket, therefore allowing compression and resilience. A closed cell foam system would be too stiff and not provide the ideal comfort to the bicyclist.

Foam 15 should also be of a sufficient thickness. It was determined that the foam 15 should be a minimum of 1 inch thick to 1 and one-half inches thick. In a perferred embodiment it has been determined that one and one-quarter inches thickness provides the required thickness to insure the bicyclist is isolated from severe bumps and shocks, but at the same time not adding substantial weight to the bicycle system.

In a second preferred embodiment, it is found that bicycle cushion set cover 5 may have a foam 15 at the front third, tongue 28, which is less than 1 inch in thickness. Through extensive experimentation, it has been determined that the thickness of the foam 15 at the tongue 28 of bicycle cushion seat cover 5 may be as little as one-quarter inch thick. The reason for this reduced thickness at the tongue 28 of bicycle cushion seat cover 5 is that the majority of the bicyclist's weight is positioned on the back of bicycle cushion set cushion 5 and that by using a small thickness foam at the tongue 28 one could reduce chaffing at the thighs and the weight of the invention.

Bicycle cushion seat cover 5 is attached to bicycle seat 8 which is a permanent fixture on the bicycle. Surrounding the bicycle cushion seat cover 5 is an exterior trim 20 which is a small round firm cylinder that prevents chaffing of the legs at the edge of bicycle cushion seat cover 5.

At the back of bicycle cushion seat cover 5 is attached aerodynamically shaped bag 10. Aerodynamically shaped bag 10 maintains its shape because of zipper 25 and exterior bag trim 30 which allows access to the interior of aerodynamically shaped bag 10. Also in FIG. 1 foam 15 is covered with outer covering 29. Outer covering 29 is composed of preferably a vinyl with density of two ounces per square foot (but also nylon, velour, or leather) and is found to provide good resistance to body shifting during bicycle turning while not allowing the thighs to develop chaffing or rashing due to repeated brushing. Outer covering 29 is tightened around foam 15 and attached at exterior trim 20.

Figure 2:
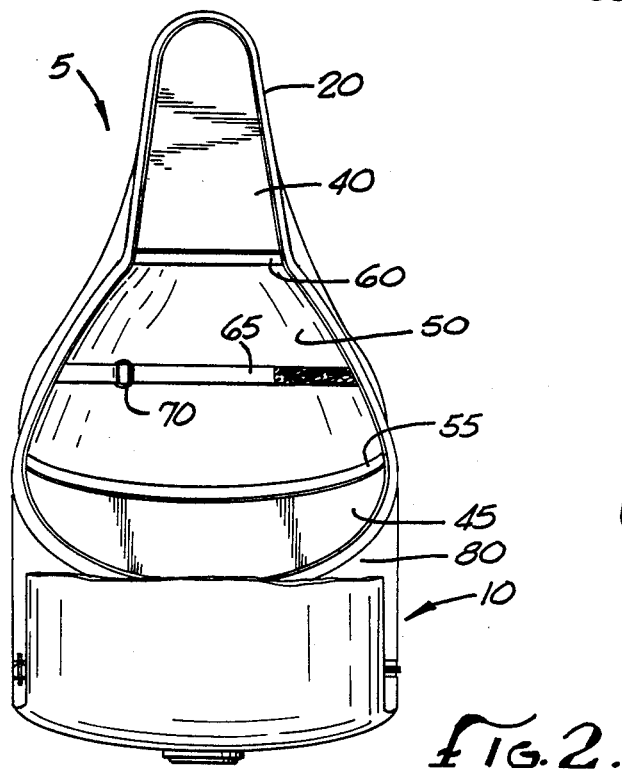
FIG. 2 is a bottom view of the bicycle cushion seat cover with aerodynamic shaped bag.

FIG. 2 depicts the back of the invention. Two underside flaps, front flap 40 and back flap 45, may be stretched and provide a gripping action to the bicycle seat 8. Underside trim, composed of front underside trim 60 and back underside trim or strap 55, provide the bicyclist with a means for allowing the bicycle cushion seat cover 5 to be applied to the bicycle seat 8. For fine adjustment adjustable secure VELCRO strap 65 is of ¾ woven cotton twill which provides some elasticity but prolongd firmness so that the bicycle cushion seat cover 5 may be securly fashioned to a wide variety bicycle seats 8.

For fine adjustment adjustable secure Velcro strap 65 is fastened with the use of ring 70. The underside of aerodynamic shaped bag 10 (shown partially cut off) is shown attached to the back of exterior trim 20. Underside lining 50 is important in insuring no slippage occur during severe bumps and shifts by the bicyclist. It has been found that underside lining 50 should be a very dense bedding construction fabric having a density of at least 2 ounces per square yard. Also, the underside lining 50 must have a rough surface and not stretch under severe stresses in order to keep bicycle cushion seat cover 5 in a firm position.

Figure 3:
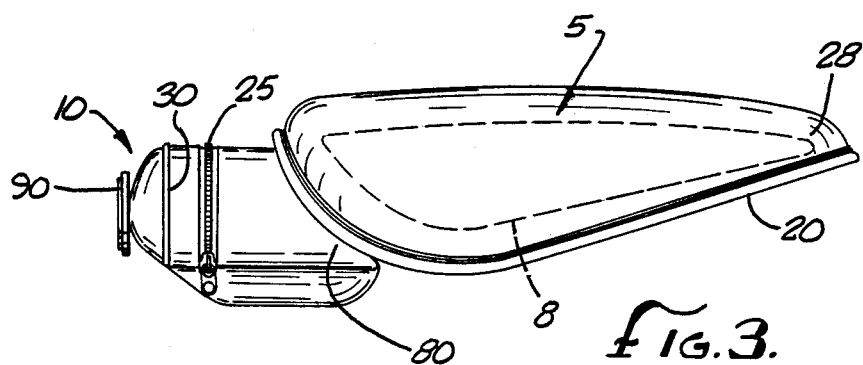
FIG. 3 is a side view of the invention.

In FIG. 3 bicycle cushion seat cover 5 is shown in a side view attached to aerodynamic shaped bag 10. Zipper 25 and exterior bag trim 30 provide the structure for the bag so that it will maintain its shape with various components inside and various forces such as wind and rain applied on the outside. The front of aerodynamic shaped bag 10 is precisely contoured as to take up the dead space 80 created by the design of bicycle cushion seat cover 5. Also, in the preferred embodiment aerodynamic shaped bag 10 is made of 1000 Denier Nylon which provides support to the back structure.

Figure 4:
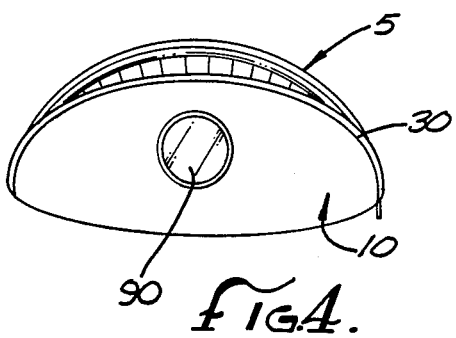
FIG. 4 is a back view of the invention.

In FIG. 4 a reflector 90 is added to the back of aerodynamic shaped bag 10 for safety. Also shown in FIG. 4 is that the height of aerodynamic shaped bag 10 and length of aerodynamic shaped bag 10 are smaller than the back heighth of bicycle cushion seat cover 5 and back length of bicycle cushion seat cover 5, therefore providing an aerodynamic effect of reducing drag.

The invention, therefore, has been described in its preferred embodiment. It is clear that the invention, however, is subseptible to numerous modifications within the ability of those skilled in the art and without exercise of inventive facility. Accordingly, the scope of the invention is defined by the scope of the following claims.

It is claimed:

1. A combined bicycle seat cover and travel bag which is configured for rider comfort, aerodynamic efficiency, and ease of installation and use, comprising:
   a seat cover assembly of a generally flat triangular configuration narrowed to a tongue at its forward end and having both its forward and rearward extremities smoothly curved, including an open-celled foam cushion member whose rearward end portion has a thickness between one inch and one and one-half inches and whose forward tongue portion has a thickness between one quarter inch and one inch, a top cover liner made of vinyl and pulled tightly over said cushion, and a bottom cover liner adapted to engage the bicycle seat;
   a small, firm exterior trim member extending about the entire periphery of said seat cover assembly and attached to said top and bottom cover liners;
   a stretchable front under flap member extending transversely beneath said tongue portion of said seat cover assembly with its edges secured to said exterior trim member, and having an under trim member secured to its rearward edge, said front under flap member and said under trim member being adapted to be placed underneath and thereby grip the tongue portion of the bicycle seat;
   a stretchable back under flap member extending transversely beneath the rearward end portion of said seat cover assembly with its edges secured to said exterior trim member, and having a transversely extending back strap secured to its forward edge, said back under flap member and said back strap being adapted to be placed underneath and thereby grip the rearward end portion of the bicycle seat;
   an adjusting strap disposed intermediate to said under trim member and said back strap, having respective end portions secured to said exterior trim member at respective sides of said seat cover assembly, said adjusting strap being adapted to be passed beneath the bicycle seat and having a fine adjusting means cooperating therewith;
   a travel bag extending rearwardly from said seat cover assemblyl, said travel bag having a closed forward end secured to the rearward portion of said exterior trim member, having a closed rearward end, having an exterior bag trim member which extends transversely about said rearward end thereof for maintaining the shape of the bag, and having a transversely extending zipper in its upper surface intermediate its length for gaining access to the bag; and
   the maximum width of said bag being substantially no greater than the maximum width of said seat cover assembly and the forward end of said travel bag being smoothly curved to provide a smooth aerodynamic action when the bicycle is moving.

2. The bicycle seat cover of claim 1 wherein said adjusting strap has a ring attached to one of its end portions, its other end portion being of a hook and pile construction and being adapted to be pulled through said ring and fastened to itself in order to finely adjust the securing action of said adjusting strap.

3. The seat cover of claim 1 wherein said under trim member and said back strap are composed of wool cotton twill of approximately ¾ inch width, providing both firmness and elasticity.

* * * * *